United States Patent Office 2,796,325
Patented June 18, 1957

2,796,325

PROCESS OF MAKING ALKALINE SULFIDES AND SULFITES

Eugene R. Bertozzi, Mercerville, N. J., assignor, by mesne assignments, to Thiokol Chemical Corporation, Trenton, N. J., a corporation of Delaware No Drawing. Application October 24, 1951, Serial No. 252,991

9 Claims. (Cl. 23—129)

In the art of manufacturing polysulfide polymers it is now well known that such polymers may be made by reacting poly halogenated organic compounds with alkali or alkaline earth polysulfides, for example, sodium polysulfides having a sulfur rank of about 2 to 5, for example, $Na_2S_2$ and $Na_2S_3$, $Na_2S_4$ and $Na_2S_5$. The corresponding calcium polysulfides may also be used. In view of U. S. Patent 2,466,963, April 12, 1949, it is also known that such polymers may be converted from an extremely high molecular weight to polymers having lower molecular weight by a cleavage or splitting reaction by means of an alkaline sulfide splitting agent in conjunction with an alkaline sulfite acting as an acceptor of sulfur. Such lower molecular weight products are widely used in industry as coating and impregnating compounds.

It will therefore be apparent that alkaline sulfides and sulfites are important reagents or reactants in the art of polysulfide polymers.

It is known that sodium polysulfide having various sulfur ranks, as, for example, sodium tetra sulfide, may be produced according to the following equation:

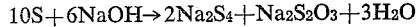

$$10S + 6NaOH \rightarrow 2Na_2S_4 + Na_2S_2O_3 + 3H_2O$$

In the polysulfide polymer art, sodium thio sulfate produced by this method is a waste product. Therefore, that method results in a loss of ⅓ of the sodium of the caustic soda and 20% of the sulfur. In addition to the uneconomical effects attending this method it has the further disadvantage of causing stream pollution when the waste product is disposed of by running into rivers, etc., and a waste disposal problem if diversion into streams and the like is not adopted. Furthermore, it has so far not been found possible to produce sodium monosulfide by this reaction.

The present invention includes the following objects and advantages:

Instead of sodium thio sulfate, sodium sulfite is obtained. In other words, instead of a waste product, a product needed in the polysulfide art is produced and the sodium sulfite so obtained is insoluble in an aqueous solution of the sulfide reaction product and thereby may readily be separated by filtration or centrifuging.

In the prior art method above described the caustic soda has been used in the form of aqueous solutions having concentrations not greater than about 30% by weight and the temperature of the reaction has not exceeded about 110° C. The surprising and unexpected advantages of the present invention have been obtained by increasing the concentration of the caustic soda so that it is not less than about 35% by weight and also increasing the temperature of the reaction so that it falls within the range of about 100° to 320° C. The latter temperature is very slightly higher than the melting point of caustic soda, which means a concentration of caustic soda of about 100%. The following equation is indicative of the present invention whereby sodium tetra sulfide and sodium sulfite are simultaneously produced:

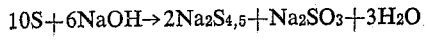

$$10S + 6NaOH \rightarrow 2Na_2S_{4,5} + Na_2SO_3 + 3H_2O$$

It will be observed that while the proportions of the reactants, that is, sulfur and caustic soda, are the same as in the prior art method first described above, the products of the reactions differ markedly since in accordance with the present invention, valuable sodium sulfite is obtained instead of the waste product sodium thio sulfate. As previously indicated, another advantage of the invention is that the sodium sulfite is insoluble in an aqueous solution of the sodium polysulfide product obtained and may be readily filtered or otherwise separated therefrom. The filtration should occur at temperatures within the above mentioned range, that is, 100° to 320° C. Normally, sodium polysulfide solutions are difficult to filter, hot or cold, and therefore it is surprising that the solutions obtained in accordance with the present invention are very readily filtered.

As above mentioned, the present invention also goes a long distance toward solving the waste disposal and stream pollution problems which have long attended the manufacture of polysulfide polymers. This solution of those problems seems to be due in part at least to the elimination of the waste sodium thiosulfate which was formerly necessarily produced.

The invention will be defined in the claims and will be specifically illustrated by the following examples:

*Example 1.*—30 mols (2400 grams) of 50% sodium hydroxide solution and 15 mols (480 grams) sulfur were heated to boiling at 120° C. with slow agitation in a stainless steel container and then heated further to boil off water until the temperature reached 140° C. This required a period of one hour. The reaction was held at 140° with slow agitation for about 8 hours and was then filtered through a Buechner funnel, using ordinary filter paper, at about 100° C. Very rapid and easy filtration resulted. A small quantity of hot water was poured over the brown filter cake in order to wash out the polysulfide and the mass of fine crystals remaining was almost white. It amounted to 495 grams dry weight (or 78% of the theory) of sodium sulfite having a purity of between 95–96%.

The resulting polysulfide had on dilution with water a molarity of 3.12, a sulfur rank of 1.12, a hydroxyl molarity of .86 and a thio sulfate molarity of 0.08.

*Example 2.*—Proceed as in Example 1, using 20 mols (640 grams) sulfur. In this example the dry weight of sulfite was 601 grams or 96% of theory and had a purity of 93–96%. The polysulfide solution obtained gave after dilution a molarity of 2.44, a sulfur rank of 1.35, an SH molarity of 0.88 and a thio sulfate molarity of 0.12.

In the above examples the terms "hydroxyl molarity" and "SH molarity" indicate the presence of unreacted sodium hydroxide and NaSH, respectively. These values are dependent on the time of reaction, the hydroxyl molarity decreasing to zero as the time of reaction increases until completion of the reaction. At the end of the reaction, if complete, there will be neither hydroxyl nor SH molarity, i. e. the product will be free of both SH and OH. Prolonged heating will result in the formation of NaSH and should be avoided unless specifically desired in certain instances.

Approximately 0.5 to 8 hours are required for the reaction to reach substantial completion and this time is dependent to some extent upon the rank of the sulfide product desired and the temperature at which the reaction is carried out. Products where the polysulfide rank (i. e. sulfur rank) is higher, for example $Na_2S_{2-5}$, may be obtained in a shorter time, whereas a sulfide product of lower sulfur rank, for example $Na_2S$, requires a longer time. At this point it may be noted that one of the advantages of the invention as compared with the prior art method hereinbefore described is that not only higher ranks of polysulfide products may be obtained but also the lower ranks and sodium monosulfide.

In cases where there is insufficient water present to dissolve the sulfide reaction product, for example, where fused or substantially dry caustic soda is used, it will be necessary to add sufficient water to the product to effect solution of said polysulfide.

The invention is also applicable to the manufacture of calcium sulfite and calcium polysulfide by reaction of sulfur with calcium hydroxide. For that purpose, sulfur is heated with an aqueous dispersion of calcium hydroxide containing not more than 70% by weight of water at temperatures of 100°–580° C. The product of the reaction is calcium polysulfide and calcium sulfite. The two products are readily separable by filtration or other suitable means by adding, if necessary, sufficient water to the reaction product to dissolve the calcium polysulfide. Since calcium monosulfide is insoluble it is necessary, in order to obtain a soluble calcium polysulfide, that is, one having a sulfur rank not less than 2 ($CaS_2$) to use a proportion of sulfur to calcium hydroxide of not less than 5 atoms of sulfur to 3 mols of calcium hydroxide.

In the case of the reaction of sulfur with caustic soda, since sodium monosulfide and sodium polysulfides have solubilities of the same magnitude, it is not necessary to use a minimum critical proportion of sulfur to caustic soda in order to insure solubility of the sodium sulfide reaction product.

A specific example of the reaction of sulfur with calcium hydroxide in accordance with the present invention is as follows:

*Example 3.*—675 grams sulfur (21 mols) were reacted with 855 grams $Ca(OH)_2$ (11.5 mols) and 2200 grams water. The reaction was stirred at 100° C. for 4 hours. Then the temperature was gradually raised to 140° C. by allowing evaporation of the water during a period of two additional hours. The reaction mixture was filtered while hot and the filter cake was washed free of aqueous sulfide using lead acetate paper as a test for the sulfide in the washings. The weight of insoluble material obtained was 400 grams which proved on analysis to be 50% calcium sulfite and approximately 50% of unreacted calcium hydroxide. The analysis of the calcium polysulfides solution obtained was

| | |
|---|---|
| Molarity as $CaS_4$ | 1.60 |
| Thiosulfate molarity | 0.04 |
| Hydroxide molarity | 0.9 |
| Sulfur content as rank | 4 |

The following table shows that the ratio of the atoms of sulfur to mols of alkaline hydroxide affects the sulfur rank of the sulfide product produced but does not affect the production of alkaline sulfite:

| Mols Alkaline Hydroxide | Atoms of Sulfur | Mols of Sulfide Product | Sulfur Rank of Sulfide Product | Mols of Sulfite |
|---|---|---|---|---|
| 6NaOH | 3 | 2 | 1 | 1 |
| 6NaOH | 5 | 2 | 2 | 1 |
| 6NaOH | 7 | 2 | 3 | 1 |
| 6NaOH | 9 | 2 | 4 | 1 |
| 6NaOH | 10 | 2 | 4, 5 | 1 |
| 6NaOH | 11 | 2 | 5 | 1 |
| $3Ca(OH)_2$ | 3 | 2 | 1 | 1 |
| $3Ca(OH)_2$ | 5 | 2 | 2 | 1 |
| $3Ca(OH)_2$ | 7 | 2 | 3 | 1 |
| $3Ca(OH)_2$ | 9 | 2 | 4 | 1 |

What is claimed is:

1. Process of reacting sulfur with calcium hydroxide in the form of an aqueous dispersion to make calcium sulfite and calcium polysulfide substantially free from thiosulfate, which comprises reacting sulfur with an aqueous dispersion of calcium hydroxide containing not more than 70% by weight of water at temperatures of 100°–320° C., the proportion of sulfur to calcium hydroxide being not less than 5 atoms of sulfur to 3 mols of calcium hydroxide, to obtain calcium polysulfide in solution and solid calcium sulfite, and mechanically separating the solid calcium sulfite from the calcium polysulfide solution at a temperature of about 100° to 320° C.

2. The process of reacting sulfur with caustic soda to produce a mixture of sodium polysulfide and sodium sulfite substantially free from sodium thiosulfate, which comprises using the caustic soda in the form of a member of the group consisting of (*a*) an aqueous solution having a concentration of not less than about 35% by weight of NaOH, and (*b*) fused caustic soda, and employing a reaction temperature of about 100°–320° C., obtaining a solution of sodium polysulfide and a precipitate of sodium sulfite and separating the said precipitate from said solution mechanically at a temperature of about 100° to 320° C.

3. The process to obtain a metallic polysulfide and a metallic sulfite substantially free from thiosulfate, which comprises reacting sulfur with a liquid metallic hydroxide reagent, which is a member of the group consisting of (*a*) an aqueous solution of sodium hydroxide having a concentration of not less than about 35% by weight of sodium hydroxide, (*b*) fused sodium hydroxide, (*c*) an aqueous dispersion of calcium hydroxide containing not more than 70% by weight of water, the temperature being 100°–320° C., and obtaining a mixture of a precipitated metallic sulfite and a solution of a metallic polysulfide, and separating mechanically the said precipitate from said solution at a temperature of about 100° to 320° C.

4. The process of producing sodium sulfite and a sodium sulfide substantially free from sodium thiosulfate which comprise reacting sulfur with caustic soda in the form of a member of the group consisting of (*a*) an aqueous solution having a concentration of not less than about 35% by weight of NaOH and (*b*) fused caustic soda, at a reaction temperature of 100°–320° C., obtaining a solution of a sodium sulfide and a precipitate of sodium sulfite substantially free from sodium thiosulfate, and mechanically separating said precipitate from said solution at a temperature of about 100° to 320° C.

5. The process of producing sodium sulfite and a sodium sulfide substantially free from sodium thiosulfate which comprises reacting sulfur with an aqueous caustic soda solution containing at least 35% by weight of NaOH at a reaction temperature of 100°–320° C. to obtain a solution of a sodium sulfide and a precipitate of sodium sulfite substantially free from sodium thiosulfate, and mechanically separating said precipitate from said solution at a temperature of about 100° to 320° C.

6. The process of claim 5 and wherein said sulfide is a sodium polysulfide.

7. The process of claim 5 and wherein said sulfide is sodium monosulfide.

8. The process of reacting sulfur with caustic soda to produce a mixture of sodium polysulfide and sodium sulfite, which comprises using the caustic soda in the form of a member of the group consisting of (*a*) an aqueous solution having a concentration of not less than about 35% of NaOH, and (*b*) fused caustic soda, and employing a reaction temperature of about 100°–320° C., obtaining a solution of sodium polysulfide and a precipitate of sodium sulfite, adding water for dissolving undissolved sodium polysulfide, and separating the precipitate by filtration at a temperature of about 100°–320° C.

9. The proces of reacting sulfur with caustic soda to produce a mixture of sodium polysulfide and sodium sulfite, which comprises using the caustic soda in the form of an aqueous solution having a concentration of not less than about 35% of NaOH and employing a reaction temperature of about 120°–140° C., obtaining a solution of sodium polysulfide and a precipitate of sodium sulfite, adding water for dissolving undissolved sodium polysulfide, and separating the precipitate by filtration at a temperature of about 100° C.

References Cited in the file of this patent

UNITED STATES PATENTS

| | | |
|---|---|---|
| Re. 13,796 | Hite | Sept. 1, 1914 |
| 2,210,405 | Haywood | Aug. 6, 1940 |
| 2,346,577 | Hartman | Apr. 11, 1944 |
| 2,403,939 | MacIntire | July 16, 1946 |

FOREIGN PATENTS

| | | |
|---|---|---|
| 739,294 | France | Oct. 25, 1932 |
| 385,895 | Great Britain | Jan. 7, 1933 |
| 445,411 | Great Britain | Mar. 30, 1936 |

OTHER REFERENCES

Mellor: "Comprehensive Treatise on Inorganic and Theoretical Chemistry," vol. 2, page 630, and vol. 3, pages 752 and 753.